US012746774B2

(12) United States Patent
Dickman et al.

(10) Patent No.: US 12,746,774 B2
(45) Date of Patent: Sep. 29, 2026

(54) TAMPER EVIDENT PREPAID CARD PACKAGING

(71) Applicant: MULTI PACKAGING SOLUTIONS, INC, Lansing, MI (US)

(72) Inventors: Matt D Dickman, Plainfield, IL (US); Kenneth L Glinert, Chappaqua, NY (US); Mark H. Bailey, Trophy Club, TX (US)

(73) Assignee: Multi Packaging Solutions, Inc., Lansing, MI (US)

( * ) Notice: Subject to any disclaimer, the term of this patent is extended or adjusted under 35 U.S.C. 154(b) by 1221 days.

(21) Appl. No.: 17/762,568

(22) PCT Filed: Sep. 18, 2020

(86) PCT No.: PCT/US2020/051397
§ 371 (c)(1),
(2) Date: Mar. 22, 2022

(87) PCT Pub. No.: WO2021/061509
PCT Pub. Date: Apr. 1, 2021

(65) Prior Publication Data

US 2022/0339955 A1 Oct. 27, 2022

Related U.S. Application Data

(60) Provisional application No. 62/904,020, filed on Sep. 23, 2019.

(51) Int. Cl.
*B42D 15/04* (2006.01)
*B65D 73/00* (2006.01)
*B65D 75/30* (2006.01)
*G06Q 20/34* (2012.01)

(52) U.S. Cl.
CPC ....... *B42D 15/045* (2013.01); *B65D 73/0078* (2013.01); *B65D 75/30* (2013.01); *G06Q 20/342* (2013.01)

(58) Field of Classification Search
CPC .. B42D 15/045; B65D 73/0078; B65D 75/30; B65D 75/5833; G06Q 20/342
See application file for complete search history.

(56) References Cited

U.S. PATENT DOCUMENTS

| | | | | |
|---|---|---|---|---|
| 6,349,829 | B1 * | 2/2002 | Matheis | B65D 29/04 206/39 |
| 8,166,733 | B2 | 5/2012 | Abell | |
| 10,329,067 | B2 * | 6/2019 | Glinert | B65D 73/0007 |
| 2008/0168690 | A1 * | 7/2008 | Wagenknecht | G09F 1/04 40/124.13 |
| 2009/0107862 | A1 * | 4/2009 | Pascua | B65D 75/14 206/232 |
| 2017/0323191 | A1 | 11/2017 | Pascua | |

* cited by examiner

*Primary Examiner* — Cassandra Davis
(74) *Attorney, Agent, or Firm* — Neil G. Cohen; Rohini K. Garg

(57) ABSTRACT

A carrier comprising: (a) a first panel; (b) an opposing second panel secured to the first panel by an adhesive disposed between the first panel and the second panel near a periphery of the carrier to form a pocket between the first panel and the second panel; and (c) scoring along the first panel, the second panel, or both that aligns with the adhesive so that, if the first panel and the second panel are separated, the scoring disassembles and visually indicates the carrier has been tampered with.

19 Claims, 5 Drawing Sheets

TAMPER EVIDENT PREPAID CARD PACKAGING

FIELD

The present teachings generally relate to prepaid card packaging, and more particularly, to prepaid card packaging having a pattern to indicate if the prepaid card packaging has been open.

BACKGROUND

Prepaid cards, such as gift cards, have become more prevalent and popular in many consumer industries. For example, a customer may visit a local hardware or grocery store and purchase prepaid gift cards for a variety of categories, including restaurants, clothing, hardware, groceries, electronics, online stores, or a combination thereof. As popularity of prepaid cards continues to increase so does the need for adequate protection of the prepaid cards. Often, a fraudulent individual (i.e., a “fraudster”) may walk into a store that sells prepaid cards and copy the cards’ barcodes or identification information, thereby allowing the fraudster to use the prepaid card after a genuine customer loads the prepaid card. As a result, the genuine customer is unaware that the physical prepaid card purchased is no longer valid because the fraudster has essentially cloned the prepaid card for his or her own use.

To combat the increase in prepaid card fraud, packaging manufacturers have developed a variety of ways to prevent tampering, to indicate if a prepaid card carrier has been tampered with, or both. For example, many prepaid card carriers include tamper resistant packaging or may secure the prepaid card within a cavity of the packaging to prevent a fraudster from copying the prepaid card information. However, fraudsters continue to improve their methods of fraud by carefully extracting and replacing the prepaid cards even within tamper-resistant packaging.

Examples of prepaid card packaging can be found in U.S. Pat. Nos. 6,349,829 and 8,166,733; and U.S. Patent Publication Nos. 2013/0248406 and 2016/0031624, all of which are incorporated by reference herein for all purposes. Thus, there remains a need for more robust prepaid card carriers that better prevent tampering, more easily indicate if a prepaid card carrier has been tampered with, or both. What is needed is a carrier having clear visual indicators of when the carrier has been opened or tampered with. There remains a need for a carrier that secures a prepaid card and conceals the prepaid card’s information and/or barcode yet allows a retail store and/or customer to easily purchase the prepaid card. What is needed is a carrier having a cutout that allows a customer and/or retail store to load and/or activate a prepaid card located within carrier without opening the carrier. There remains a need for a carrier having tamper resistant packaging that allows a customer to easily remove the prepaid card from the packaging. What is needed is a carrier that includes tamper resistant and/or tamper preventative identifiers that do not interfere with the prepaid card secured therein.

SUM MARY

The present teachings meet one or more of the present needs by providing a carrier comprising: (a) a first panel; (b) an opposing second panel secured to the first panel by an adhesive disposed between the first panel and the second panel near a periphery of the carrier to form a pocket between the first panel and the second panel; and (c) scoring along the first panel, the second panel, or both that aligns with the adhesive so that, if the first panel and the second panel are separated, the scoring disassembles and visually indicates the carrier has been tampered with.

The present teachings meet one or more of the present needs by providing a method of assembling a carrier, comprising: (a) die cutting the first panel and second panel; (b) die cutting the scoring into the first panel, the second panel, or both; (c) applying an adhesive to the first panel, the second panel, or both along the periphery; (d) placing an item within the pocket free of contact with the adhesive; and (e) folding the first panel and the second panel onto one another with the adhesive disposed between the first panel and the second panel to secure the first panel and second panel together with the item therebetween, wherein steps (a) and (b) may be done simultaneously.

The present teachings meet one or more of the present needs by providing a carrier, wherein: the scoring is located along the first panel; the scoring is located along the second panel; the scoring is located on both the first panel and the second panel; the scoring is a hatch pattern forming a plurality of substantially rectangular shapes so that, when the first panel and the second panel are separated, the rectangular shapes disconnect from one another, the first panel, the second panel, or a combination thereof; a bay door is formed along the first panel by perforations and the bay door opens along a fold line by separating the perforations; the perforations are separated by pulling on a tab located along a peripheral edge of the bay door; an access panel abuts the bay door along the perforations and the access panel opens simultaneously with the bay door, independently of the bay door, or both; the access panel includes a cutout aligned with an item located in the pocket of the carrier; the first panel and the second panel are monolithically formed and folded onto each other along a fold line to create the carrier; the fold line between the first panel and the second panel is a partial cut through a thickness of the first panel and the second panel; the carrier is a paperboard; the tab extends to or beyond a peripheral edge of the first panel and is free of adhesive, scoring, or both; the carrier is unable to be reassembled after the carrier has been tampered with; the scoring is located near a peripheral edge of the first panel, the second panel or both, and a central area of the first panel and the second panel that form the pocket is free of scoring; the first panel and the second panel are coextensive; the adhesive is free of extension beyond the periphery of the carrier and the pocket is free of the adhesive; the carrier is a prepaid card packaging; or a combination thereof.

The present teachings meet one or more of the present needs by providing: a more robust prepaid card carriers that better prevent tampering, more easily indicate if a prepaid card carrier has been tampered with, or both; a carrier having clear visual indicators of when the carrier has been opened or tampered with; a carrier that secures a prepaid card and conceals the prepaid card’s information and/or barcode yet allows a retail store and/or customer to easily purchase the prepaid card; a carrier having a cutout that allows a customer and/or retail store to load and/or activate a prepaid card located within carrier without opening the carrier; a carrier having tamper resistant packaging that allows a customer to easily remove the prepaid card from the packaging; a carrier that includes tamper resistant and/or tamper preventative identifiers that do not interfere with the prepaid card secured therein; or a combination thereof.

DETAILED DESCRIPTION

Figure 1:
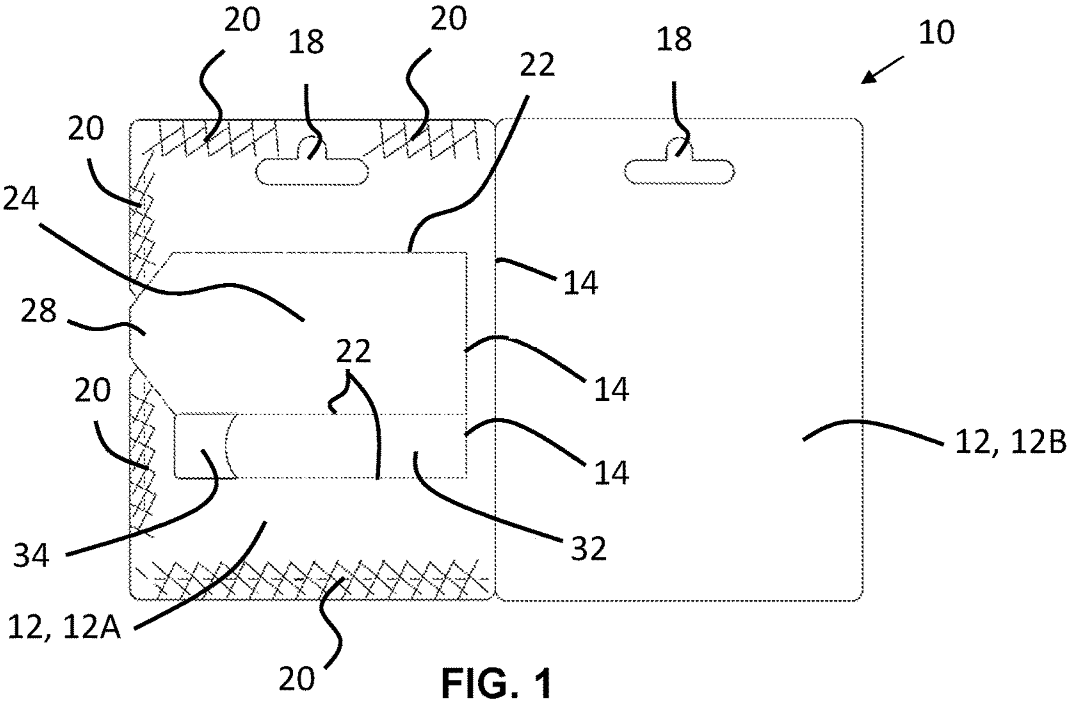
FIG. 1 is a front view of a partially assembled carrier.

The explanations and illustrations presented herein are intended to acquaint others skilled in the art with the invention, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a carrier. The carrier may function to securely house one or more items. The carrier may function to prevent tampering with the one or more items prior to a rightful owner opening the carrier. The one or more items may be a prepaid card, gift card, other loadable and/or scannable item, or a combination thereof. It is contemplated that the carrier may be configured to secure any type of item. The carrier may include one or more layers. For example, the carrier may include two or more layers, three or more layer, or four or more layers. The carrier may include six or less layers, five or less layers, or four or less layers. Alternatively, the carrier may be a single layer. For example, the carrier may be a single layer having a cavity formed therein to secure a prepaid card. The carrier may include one or more tamper resistant features, one or more tamper prevention features, or both. For example, the carrier may include cut-resistant material so that a fraudster is unable to discretely cut into the packaging without damaging the carrier. The carrier may be substantially monolithically formed (i.e., the carrier is integrally formed from a single piece of material). The carrier may be shaped to meet the needs of any desired industry. For example, the carrier may be shaped to have an inner pocket substantially the size of a prepaid card to minimize wasted material.

The carrier may include one or more panels. The panels may function to form an outer shell of the carrier. The panels may provide structural support to the carrier. The panels may house one or more items, such as a prepaid card or gift card. For example, a first panel and a second panel may form a clamshell-like structure around a prepaid card to protect the prepaid card from fraudulent activity. The carrier may include one or more panels, two or more panels, or three or more panels. The carrier may include six or less panels, five or less panels, or four or less panels. Each panel may include a plurality of layers or may be monolithically formed. The one or more panels may be integrally formed with one another to improve manufacturing efficiency and decrease material waste. For example, the one or more panels may be die cut from a single layer of stock and interconnected via one or more perforations, fold lines, or both.

The panels may be made from any material. The panels may be made from paperboard, cardboard, corrugated fiberboard, polyethylene terephthalate (PET), high-density polyethylene (HDPE), polyvinyl chloride (PVC), low-density polyethylene (LDPE), polypropylene (PP), polystyrene (PS), acrylic, nylon, polycarbonate, polylactic acid, or a combination thereof. The panels may include a surface finish. The panels may include a finish stamping to indicate a desired product and/or brand. The panels may include a protective coating. For example, the panels may include a UV-resistant and/or moisture-resistant coating to protect the prepaid card from damaging light and/or moisture.

The panels may be manufactured using a variety of methods. The panels may be thermoformed, cold pressed, stamped, molded, corrugated, calendered, or a combination thereof. The panels may be die cut or trimmed to form a desired shape of the panels. As a result, the panels may include one or more holes, punch outs, perforations, scorings, or a combination thereof. The panels may include a plurality of operations to form a final design of the panels. The panels may include an initial die cutting step to create a peripheral shape of the panels and may include a secondary die cutting step to form the holes, punch outs, perforations, scoring, cutouts, or a combination thereof. However, it is contemplated that the panels may be manufactured in a single operation. For example, the panels may be formed using a single die cut operation where the shape of the panels and the secondary features (e.g., scoring marks) of the panels are cut simultaneously.

The panels may be interconnected by a fold line. The fold line may function to provide a hinge point between the panels. The fold line may allow the panels to fold onto one another to form the clamshell-like structure. The fold line may be integrally formed with panels. For example, the fold line may be a partial cut within the panels that provides a flexible point to fold the panels relative to each other. The partial cut may go through any desired thickness of the panels. For example, the fold line may have a depth of about 1 mm or more, about 2 mm or more, or about 3 mm or more. The fold line may have a depth of about 6 mm or less, about 5 mm or less, or about 4 mm or less. The fold line may have a depth of about 20% or more, about 40% or more, or about 60% or more of the relative thickness of the panels. The fold line may have a depth or about 90% or less, about 80% or less, or about 70% or less of the relative thickness of the panels. The fold line may be free of any cut. For example, the fold line may be a localized elastic portion between panels that allows bending of the panels relative to each other.

The panels may include an aperture. The aperture may function as a hanging mechanism so that the carrier may be hung from one or more display hooks. The aperture may be any desired size and shape. The aperture may extend through an entire thickness of the panels. Each panel may include an aperture. For example, a first panel and second panel may each include an aperture having a substantially similar shape so that, when the first panel and second panel are joined together to form the carrier, the aperture of the first panel aligns with the aperture of the second panel so that a hook may extend through the carrier. The aperture may be positioned anywhere along the panels. The aperture may be positioned along a periphery of the panels so that a pocket housing the prepaid card is not accessible through the aperture. The aperture may be a die cut hole in the panels or may be punched out after manufacturing the panels.

The panels may be joined together by an adhesive. The adhesive may function to connect the panels to each other and form the carrier. The adhesive may function to prevent a fraudster from opening the carrier and accessing a prepaid card located within the carrier. The adhesive may be disposed anywhere along the panels. The adhesive may be disposed on one or more mating surfaces of the panels so that, when the opposing surfaces abut on another, the adhesive bonds together the opposing surfaces and forms a seal between the panels. The adhesive may be positioned anywhere along the opposing surfaces of the panels. The adhesive may be positioned along one or more edges of the panels, one or more edges of the panels may be free of an adhesive, or both. For example, the adhesive may be disposed on a surface of one or more panels near a plurality of peripheral edges but a peripheral edge of the panel having a fold line may be free of the adhesive. The adhesive may be coextensive with one or more edges of the panel. The adhesive may extend beyond one or more edges of the panel. Alternatively, the adhesive may remain within the confines of the panel so that the adhesive does not extend beyond the boundaries of the panels. An inner pocket of the carrier may be free of the adhesive so that a prepaid card may be freely removed from the carrier. Alternatively, the inner pocket may include the adhesive to secure the prepaid card to one or more panels of the carrier. The adhesive may be strong enough to maintain a position of the prepaid card yet allow for adhesive failure without damaging the prepaid card upon removal.

The adhesive may be any desired composition. The adhesive may be polyvinyl acetate (PVA) glue, cyanoacrylate, a pressure sensitive adhesive (PSA), epoxy, polyurethane, other polymers, or a combination thereof.

When adhered to each other, the panels may form a pocket. The pocket may function to house one or more prepaid cards. The pocket may provide a secure location for the prepaid card that is not visible and/or accessible without opening the carrier in an irreparable manner. The pocket may include a contoured surface that creates a cavity having a size substantially similar to the prepaid cards. The pocket may be free of adhesives. The pocket may include adhesive disposed on one or more inner surfaces. The pocket may be fully enclosed or may be partially enclosed. The pocket may be shaped substantially similar to the prepaid cards so that the prepaid cards remain in a desired position during transportation of the carrier to prevent damage to the prepaid cards. The pocket may be positioned anywhere between the panels. For example, the pocket may be formed having a clamshell-like structure near a central interior portion of the carrier. The pocket may be substantially hollow. The pocket may include one or more padded portions to prevent damage of the prepaid cards within the package.

The pocket may be accessible via a bay door on one or more of the panels. The bay door may function as an access point for a user to remove the prepaid card after purchase and/or loading. The bay door may be formed within one or more of the panels. For example, the bay door may be cut into the one or more panels as a secondary feature. The bay door may include one or more fixed portions that remain connected to the panel so that the bay door pivots about a hinge point between the bay door and the panel. The hinge point may be a fold line between the panel and the bay door. The fold line may be the fold line between the one or more panels or may be a different fold line. For example, the carrier may have a first fold line between a pair of opposing panels and a second fold line between the bay door and one or both of the opposing panels. The fold lines may be positioned substantially perpendicular to each other, parallel to each other, or may be positioned at any desired angle relative to each other. For example, opposing panels may be joined by a first fold line along a peripheral edge of the resultant carrier while the bay door may be joined to one of the opposing panels by a second fold line substantially parallel to the first fold line and located near a central portion of the panel.

The bay door may be a single door or may be a plurality of doors. The bay door may open in any desired manner. The bay door may be opened and closed when desired. However, it is contemplated that, to prevent tampering with the carrier, the bay door may open once to access a prepaid card within the pocket, but a user may not close the bay door after opening. By preventing closing of the bay door, the carrier may visually indicate that the carrier is opened, thereby notifying a customer seeking to purchase or load the prepaid card. The bay door may be any desired size and shape. For example, the bay door may have dimensions similar to or greater than dimensions of a prepaid card within the pocket so that the prepaid card may be easily removed from the carrier through the opened bay door.

The bay door may have a tab. The tab may function as a handle for a user to open the bay door. The tab may provide a grip for a user so that a user may pull on the tab and provide a sufficient force to open the bay door. The tab may be located anywhere along the bay door. The tab may be located along a peripheral edge of the bay door. For example, the tab may be positioned along a first edge of the bay door while a fold line may be positioned along a second opposing edge of the bay door so that, when a pull force is applied to the tab, the bay door pivots along the fold line. The tab may extend outward away from a periphery of the carrier. The tab may be positioned within the confines of the bay door. For example, the tab may be located along a central portion away from any terminal edges of the bay door. The tab may project in any direction away from the bay door. For example, the tab may project substantially orthogonal to a surface of the bay door. Alternatively, the tab may be substantially coplanar with the bay door. The tab may be any desired size and shape. The tab may be free of any adhesive, scoring, or both. Thus, it is contemplated that the tab may be free of any adhesive and/or scoring so that the tab may be freely pulled without damaging the carrier or a prepaid card within the carrier.

The bay door may abut an access panel. The access panel may function to provide a retail store, customer, or both access to a barcode and/or identification number along a prepaid card within the carrier without fully opening the carrier. The access panel may provide an openable window for a retail store, customer, or both to identify the contents within the pocket of the carrier. The access panel may have dimensions smaller than dimensions of a prepaid card within the pocket. Accordingly, the prepaid card may be identified, scanned, or both without removing the prepaid card from the carrier. However, the access panel may require opening prior to viewing a portion of the prepaid card. As such, the access panel may further prevent or dissuade tampering by easily indicating when a fraudster has opened the access panel to copy the prepaid card's information. Thus, it is contemplated that the access panel may open freely yet prevent closing of the access panel to easily indicate tampering.

The access panel may be connected to the panel by a fold line. The fold line may be the same fold line as the bay door, the fold line between panels, a different fold line, or a combination thereof. The fold line may be structured similar to any other fold line along the panels or may be different. For example, the fold lines may along a panel may all be partial cuts of the panel or a portion of the fold lines may be a partial cut while another portion of the fold lines may be a flexible portion of the panel free of partial cuts. The access panel may abut the bay door. As such, the access panel and the bay door may be opened simultaneously, independently, or both. The access panel may be positioned along a portion of the pocket to align with a prepaid card within the carrier. The access panel may be removable.

The access panel may include a cutout. The cutout may function as an entry into the pocket of the carrier. The cutout may function to provide a retail store, a customer, a manufacturer, or a combination thereof a window to confirm if a prepaid card is present within the carrier. The cutout may be a window that extends into the pocket of the carrier. The cutout may be any desired size and shape. The cutout may have dimensions smaller than dimensions of the prepaid card, smaller than dimensions of a barcode or identification number printed on the prepaid card, or both. Therefore, it is contemplated that a user or operator may identify a prepaid card within the carrier without being able to fully scan or copy a barcode and/or identification number of the prepaid card. For example, the prepaid card may include a first barcode aligned with the cutout so that a retail store may scan and confirm a prepaid card's value yet a second barcode may be positioned behind the access panel only to be opened by a customer for future use of the prepaid card.

The access panel, the bay door, or both may be connected to each other, one or more panels, or a combination thereof by perforations. The perforations may function to removably secure a portion of the access panel, the bay door, or both to the one or more panels. The perforations may extend along one or more edges of the access panel, the bay door, or both. The perforations may outline a shape of the access panel, the bay door, or both. For example, the panels may be die cut from a paperboard and a secondary operation may die cut perforations within the boundaries of the panels that form the bay door and the access panel. The perforations may be any desired size and shape. The perforations may extend through a thickness of the panels. The perforations may extend through only a portion of the thickness of the panels (e.g., the perforations are a partial cut). The perforations may be any desired size and shape. The perforations may be spaced apart in any desired manner. The perforations may allow a user to apply a desired pull and/or push force to the bay door, the access panel, or both that breaks the perforations so that the bay door, the access panel, or both open freely along a fold line. However, once the perforations have been broken, the bay door, the access panel, or both may not be resealed or reconnected to the panels. Thus, tampering of the carrier by opening the access panel, the bay door, or both may be easily identified.

In addition to, or in lieu of, the perforations, the carrier may include scoring in one or more areas to prevent tampering, identify tampering, or both. The scoring may function to visually indicate when panels of the carrier have been separated. The scoring may function to damage one or more panels of the carrier upon tampering. The scoring may be a pattern of cuts along one or more of the panels of the carrier. The scoring may be any desired pattern. The desired pattern may be cross-hatching, diagonal lines, vertical lines, random, dotted, triangular, or a combination thereof. For example, the scoring may be a cross-hatching pattern creating a plurality of substantially rectangular portions. Alternatively, or additionally, the scoring may include one or more diamond-shaped patterns extending along a portion of the carrier. The diamond patterns may be interconnected, separated, or both. Accordingly, when panels of the carrier are separated, the plurality of substantially rectangular or diamond portions may fall apart and/or tear away from the panels, thereby providing easy visual identification that the carrier has been tampered with.

The scoring may be positioned anywhere along the one or more panels. The scoring may be aligned with an adhesive between panels of the carrier. As such, it is contemplated that the scoring or a scored portion of the one or more panels is adhered to an opposing panel so that, upon separation of the panels, the scoring separates and shows clear damage of the panels. The scoring may be cut so that the carrier remains intact during normal operation yet easily disassembles or tears apart during tampering.

The scoring may be positioned anywhere along the one or more panels. The scoring may extend along one or more surfaces of the one or more panels. The scoring may be positioned near one or more edges of the panels. The scoring may be located near a plurality of peripheral edges of the carrier, yet a fold line may be free of scoring. The scoring may extend through a thickness of the one or more panels or may be a partial cut through the one or more panels. For example, the scoring may cut through about 20% or more, about 40% or more, or about 60% or more of the thickness of the one or more panels. The scoring may cut through about 100% or less, about 80% or less, or about 70% or less of the thickness of the one or more panels. The scoring may be done during cutting of the one or more panels or may be a secondary operation after a shape of the panels has been cut. The bay door, the access panel, or both may be free of scoring. A portion of the one or more panels that forms the pocket of the carrier may be free of scoring. For example, scoring may only be located along the one or more panels that aligns with the adhesive of the carrier.

The scoring may be located on one panel or a plurality of panels. For example, the carrier may comprise a first panel and an opposing second panel joined together by the adhesive that forms the clamshell-like shape of the carrier. The first panel may have scoring along an adhered portion, the second panel may have scoring along an adhered portion, or both. The scoring may extend along substantially an entire length, an entire width, or both of one or more panels. The scoring may extend along only a portion of a length, a width, or both of one or more panels. For example, a tab of a bay door may extend to a peripheral edge of the panel and be free of scoring, yet the remaining portion of the peripheral edge may include scoring.

The carrier as discussed herein may be configured to carry a gift card, a prepaid card, or both. The gift card or prepaid card may be any card for any industry that may be loaded with a desired dollar amount and used for purchases. The gift card or prepaid card may include one or more barcodes, one or more identification numbers, other identification stamps, or a combination thereof. The gift card or prepaid card may be any desired size and shape. As such, it is contemplated that the carrier may be configured to fit any size prepaid card or gift card. For example, the carrier may include a plurality of pockets or a plurality or prepaid cards may be positioned in a single pocket. Thus, it should be noted that the carrier may include a variety of configurations in regards to the number of bay doors, pockets, access panels, panels, perforations, scoring, or a combination thereof.

Turning now to the figures, FIG. 1 illustrates a front view of a partially assembled carrier 10. As illustrated, the carrier 10 includes a pair of panels 12. A first panel 12A and a second panel 12B are joined along a fold line 14. The first panel 12A and the second panel 12B are configured to fold on top of one another along the fold line 14 so that the panels 12 may be secured to each other by an adhesive and form a pocket (see FIG. 5). Each panel 12 includes an aperture 18 that align once the carrier 10 is assembled (see FIGS. 2A and 2B). The first panel 12A includes scoring 20 along a plurality of peripheral edges so that, once the first panel 12A and the second panel 12B are joined together by the adhesive, the scoring 20 will indicate whether the carrier 10 has been tampered with (i.e., a person attempts to separate the panels 12). The first panel 12A further includes a bay door 24 and an access panel 32 joined to each other and the first panel 12A by a plurality of perforations 22. The bay door 24 and the access panel 32 are configured to open by separating the bay door 24 and the access panel 32 along the perforations 22 and fold the bay door 24 and the access panel along fold lines 14. It should be noted that the bay door 24 and the access panel 32 may be opened separately or simultaneously depending on which perforations 22 are separated. For example, the bay door 24 may be opened separately by pulling on the bay door 24 using a tab 28 located along a peripheral edge of the bay door 24. The access panel 32 further includes a cutout 34 that allows visual confirmation of an item located within the carrier 10. For example, the cutout 34 may allow a retail store selling a prepaid card stored within the carrier 10 to confirm a serial number and/or barcode of the prepaid card without opening the carrier 10.

Figure 2A:
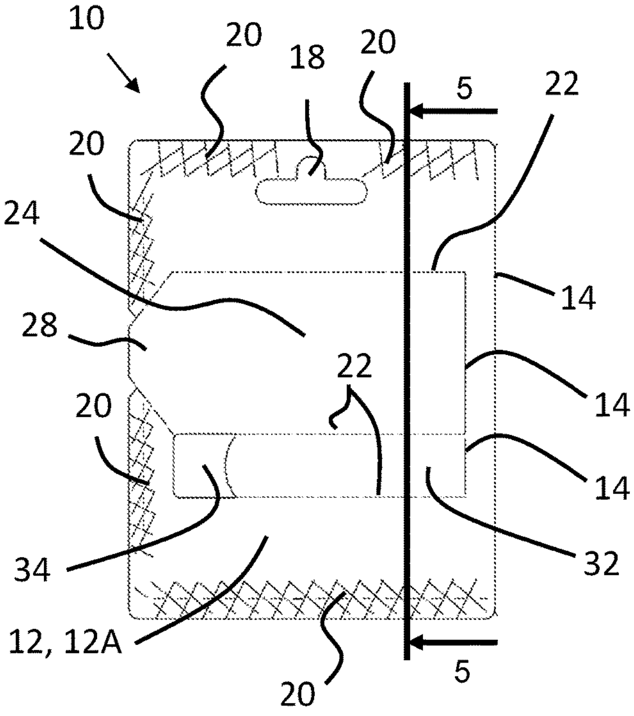
FIG. 2A is a front view of the carrier of FIG. 1.
Figure 2B:
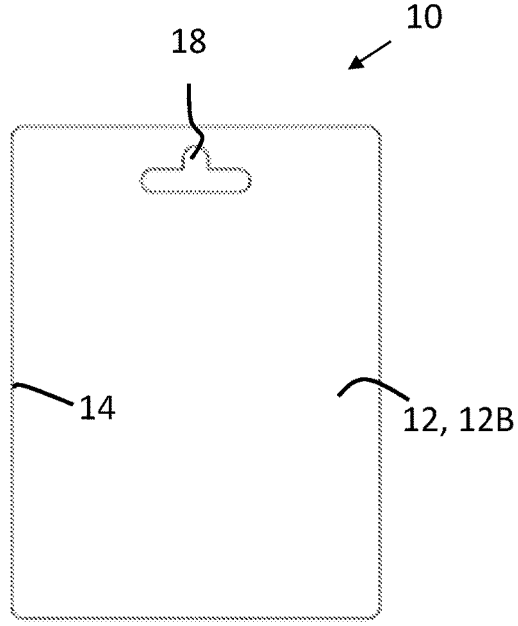
FIG. 2B is a back view of the carrier of FIG. 1.

FIGS. 2A and 2B illustrate a front view and a back view of the carrier 10 of FIG. 1, respectively. The carrier 10 includes a plurality of panels 12 joined by an adhesive to form a pocket (see FIG. 5). Apertures 18 located on a first panel 12A and a second panel 12B align with one another when the panels 12 are folded on to one another along a fold line 14. As illustrated, the first panel 12A includes scoring 20 along a plurality of peripheral edges so that, once the first panel 12A and the second panel 12B are joined together by the adhesive, the scoring 20 will indicate whether the carrier 10 has been tampered with (i.e., a person attempts to separate the panels 12). The first panel 12A further includes a bay door 24 and an access panel 32 joined to each other and the first panel 12A by a plurality of perforations 22. The bay door 24 and the access panel 32 are configured to open by separating the bay door 24 and the access panel 32 along the perforations 22 and fold the bay door 24 and the access panel along fold lines 14. It should be noted that the bay door 24 and the access panel 32 may be opened separately or simultaneously depending on which perforations 22 are separated. For example, the bay door 24 may be opened separately by pulling on the bay door 24 using a tab 28 located along a peripheral edge of the bay door 24. The access panel 32 further includes a cutout 34 that allows visual confirmation of an item located within the carrier 10. For example, the cutout 34 may allow a retail store selling a prepaid card stored within the carrier 10 to confirm a serial number and/or barcode of the prepaid card without opening the carrier 10.

Figure 3:
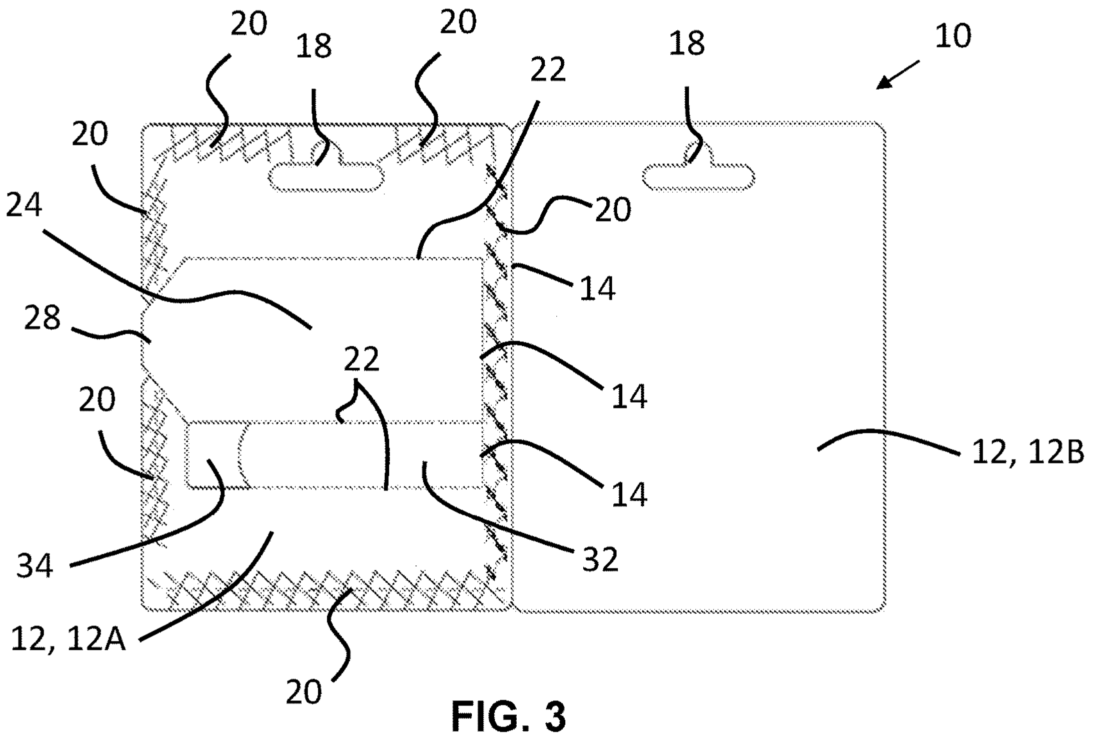
FIG. 3 is a front view of a partially assembled carrier.

FIG. 3 illustrates a front view of a partially assembled carrier 10. As illustrated, the carrier 10 includes a pair of panels 12. A first panel 12A and a second panel 12B are joined along a fold line 14. The first panel 12A and the second panel 12B are configured to fold on top of one another along the fold line 14 so that the panels 12 may be secured to each other by an adhesive and form a pocket (see FIG. 5). Each panel includes an aperture 18 that align once the carrier is assembled (see FIGS. 2A and 2B). The first panel 12A includes scoring 20 along a plurality of peripheral edges and along the fold line 14 so that, once the first panel 12A and the second panel 12B are joined together by the adhesive, the scoring 20 will indicate whether the carrier 10 has been tampered with (i.e., a person attempts to separate the panels 12). The first panel 12A further includes a bay door 24 and an access panel 32 joined to each other and the first panel 12A by a plurality of perforations 22. The bay door 24 and the access panel 32 are configured to open by separating the bay door 24 and the access panel 32 along the perforations 22 and fold the bay door 24 and the access panel along fold lines 14. It should be noted that the bay door 24 and the access panel 32 may be opened separately or simultaneously depending on which perforations 22 are separated. For example, the bay door 24 may be opened separately by pulling on the bay door 24 using a tab 28 located along a peripheral edge of the bay door 24. The access panel 32 further includes a cutout 34 that allows visual confirmation of an item located within the carrier 10. For example, the cutout 34 may allow a retail store selling a prepaid card stored within the carrier 10 to confirm a serial number and/or barcode of the prepaid card without opening the carrier 10.

Figure 4A:
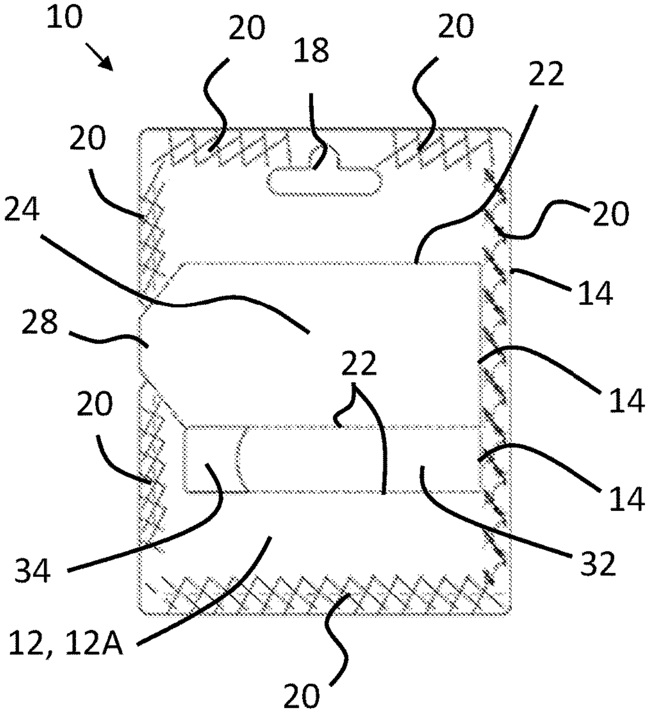
FIG. 4A is a front view of the carrier of FIG. 3.
Figure 4B:
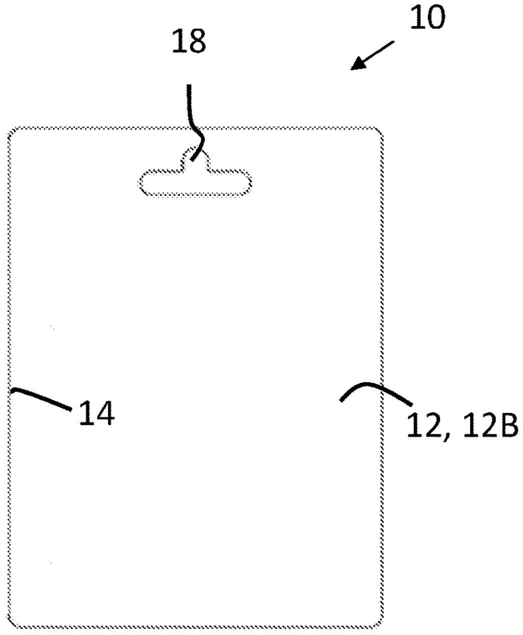
FIG. 4B is a back view of the carrier of FIG. 3.

FIGS. 4A and 4B illustrate a front view and a back view of the carrier 10 of FIG. 3, respectively. The carrier 10 includes a plurality of panels 12 joined by an adhesive to form a pocket (see FIG. 5). Apertures 18 located on a first panel 12A and a second panel 12B align with one another when the panels 12 are folded on to one another along a fold line 14. As illustrated, the first panel 12A includes scoring 20 along a plurality of peripheral edges and the fold line 14 so that, once the first panel 12A and the second panel 12B are joined together by the adhesive, the scoring 20 will indicate whether the carrier 10 has been tampered with (i.e., a person attempts to separate the panels 12). The first panel 12A further includes a bay door 24 and an access panel 32 joined to each other and the first panel 12A by a plurality of perforations 22. The bay door 24 and the access panel 32 are configured to open by separating the bay door 24 and the access panel 32 along the perforations 22 and fold the bay door 24 and the access panel along fold lines 14. It should be noted that the bay door 24 and the access panel 32 may be opened separately or simultaneously depending on which perforations 22 are separated. For example, the bay door 24 may be opened separately by pulling on the bay door 24 using a tab 28 located along a peripheral edge of the bay door 24. The access panel 32 further includes a cutout 34 that allows visual confirmation of an item located within the carrier 10. For example, the cutout 34 may allow a retail store selling a prepaid card stored within the carrier 10 to confirm a serial number and/or barcode of the prepaid card without opening the carrier 10.

Figure 5:
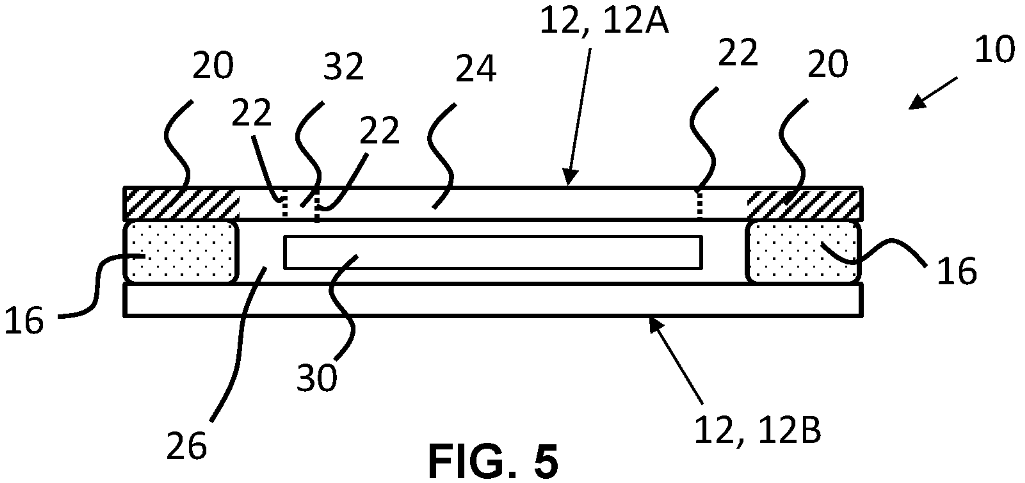
FIG. 5 is cross-section 3-3 of FIG. 2A.

FIG. 5 illustrates cross-section 5-5 of the carrier 10 of FIG. 2A. A first panel 12A and a second panel 12B are joined together by an adhesive 16 disposed between the panels 12. Once joined, the panels 12 form a pocket 26 to secure a prepaid card 30 between the panels 12. However, it should be noted that any item may be contained within the pocket 26. As illustrated, the first panel 12A includes scoring 20 aligned with the adhesive 16 so that, if a fraudster separates the panels 12, the scoring 20 may notify the appropriate person that the carrier 10 has been tampered with. The first panel 12A further includes a bay door 24 and an access panel 32 separated by perforations 22 extending through the first panel 12A to allow a user to open the bay door 24, the access panel 32, or both (see FIG. 2A).

Figure 6A:
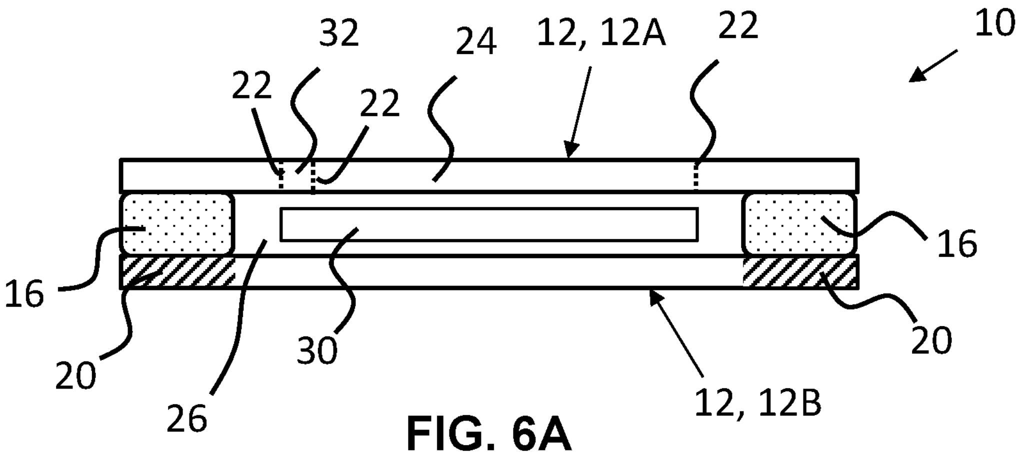
FIG. 6A is a cross-sectional view of a carrier having scoring on a second panel.
Figure 6B:
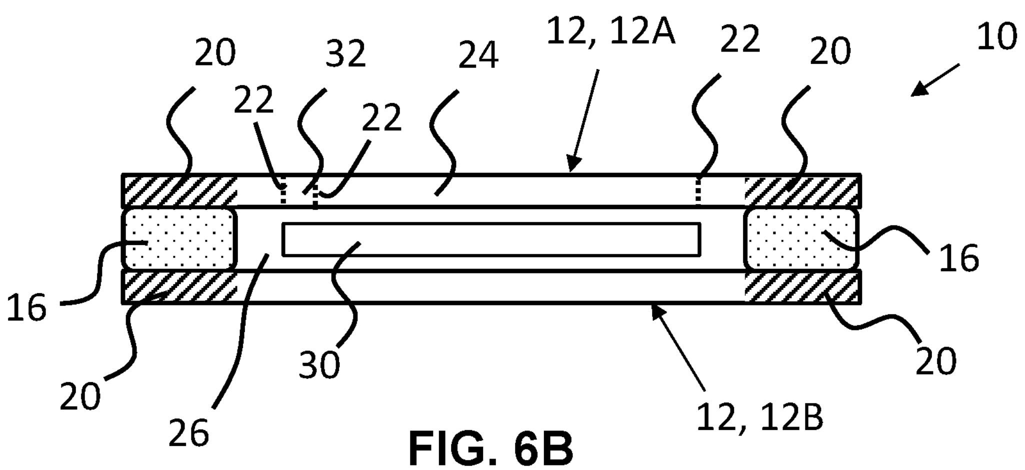
FIG. 6B is a cross-sectional view of a carrier having scoring on both a first panel and a second panel.

FIGS. 6A and 6B illustrate exemplary cross-sections of a carrier 10. The carrier 10 includes a first panel 12A and a second panel 12B joined together by an adhesive 16 disposed between the panels 12. Once joined, the panels 12 form a pocket 26 to secure a prepaid card 30 between the panels 12. However, it should be noted that any item may be contained within the pocket 26. As shown in FIG. 6A, the second panel 12B includes scoring 20 aligned with the adhesive 16 so that, if a fraudster separates the panels 12, the scoring 20 may notify the appropriate person that the carrier 10 has been tampered with. However, as illustrated in FIG. 6B, it is contemplated that the scoring 20 may be located on both the first panel 12A and the second panel 12B. The first panel 12A further includes a bay door 24 and an access panel 32 separated by perforations 22 extending through the first panel 12A to allow a user to open the bay door 24, the access panel 32, or both (see FIG. 2A).

Figure 7:
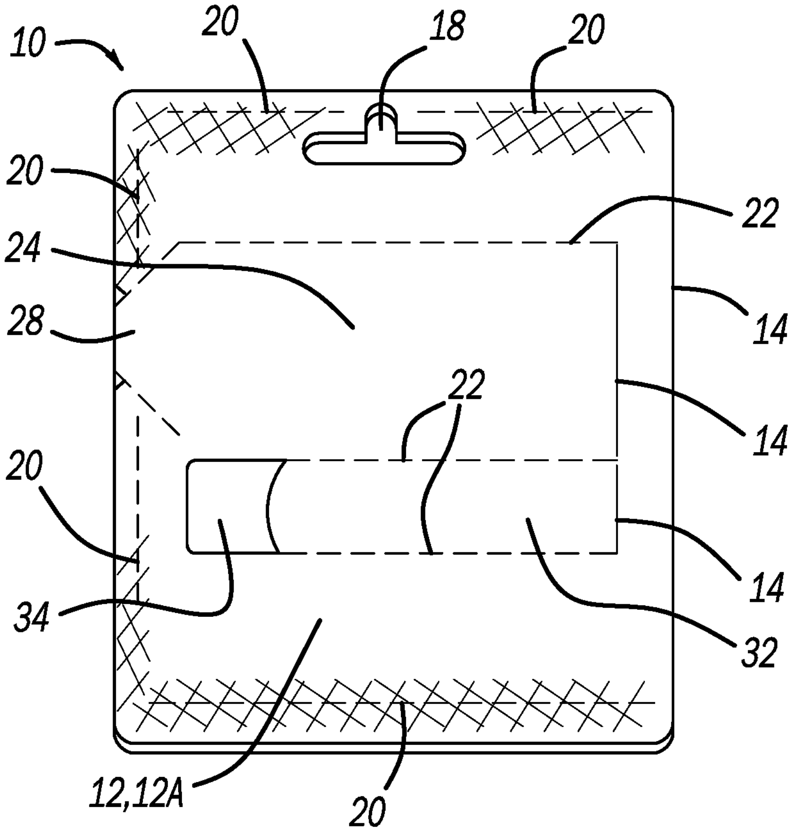
FIG. 7 is a top perspective view of a carrier.
Figure 8:
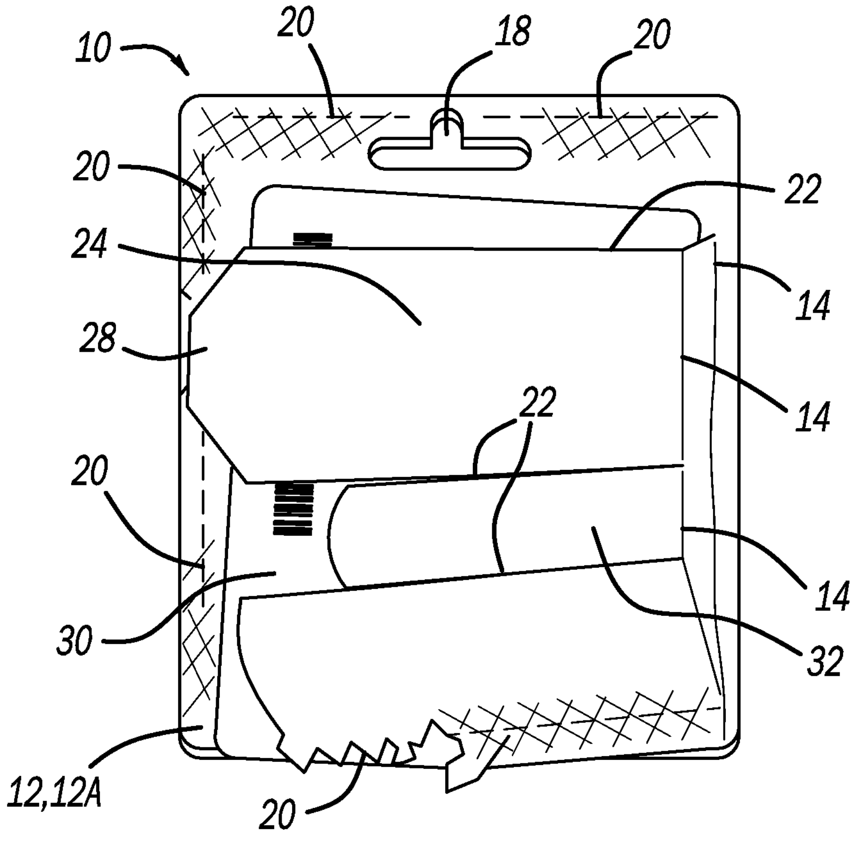
FIG. 8 is a top perspective view of a carrier after tampering.

FIGS. 7 and 8 illustrate a top perspective view of a carrier 10 before tampering and after tampering, respectively. The carrier 10 includes a plurality of panels 12 joined by an adhesive to form a pocket (see FIG. 4). Apertures 18 located on a first panel 12A and a second panel (not shown) align with one another when the panels 12 are folded on to one another along a fold line 14 (see FIG. 1). As illustrated, the first panel 12A includes scoring 20 along a plurality of peripheral edges so that, once the first panel 12A and the second panel are joined together by the adhesive, the scoring 20 will indicate whether the carrier 10 has been tampered with (i.e., a person attempts to separate the panels 12). The first panel 12A further includes a bay door 24 and an access panel 32 joined to each other and the first panel 12A by a plurality of perforations 22. The bay door 24 and the access panel 32 are configured to open by separating the bay door 24 and the access panel 32 along the perforations 22 and fold the bay door 24 and the access panel along fold lines 14. It should be noted that the bay door 24 and the access panel 32 may be opened separately or simultaneously depending on which perforations 22 are separated. For example, the bay door 24 may be opened separately by pulling on the bay door 24 using a tab 28 located along a peripheral edge of the bay door 24. The access panel 32 further includes a cutout 34 that allows visual confirmation of an item located within the carrier 10. For example, the cutout 34 may allow a retail store selling a prepaid card 30 stored within the carrier 10 to confirm a serial number and/or barcode of the prepaid card without opening the carrier 10.

As shown in FIG. 7, the perforations 22 and scoring 20 may remain connected and intact prior to a user opening the carrier 10. However, as illustrated in FIG. 8, if a fraudster tampers with the carrier 10 by opening the bay door 28, opening the access panel 32, separating the panels 12, or a combination thereof, the perforations 22 and the scoring 20 may visually indicate that the carrier 10 has been tampered with and is no longer acceptable to sell to a consumer.

Figure 9:
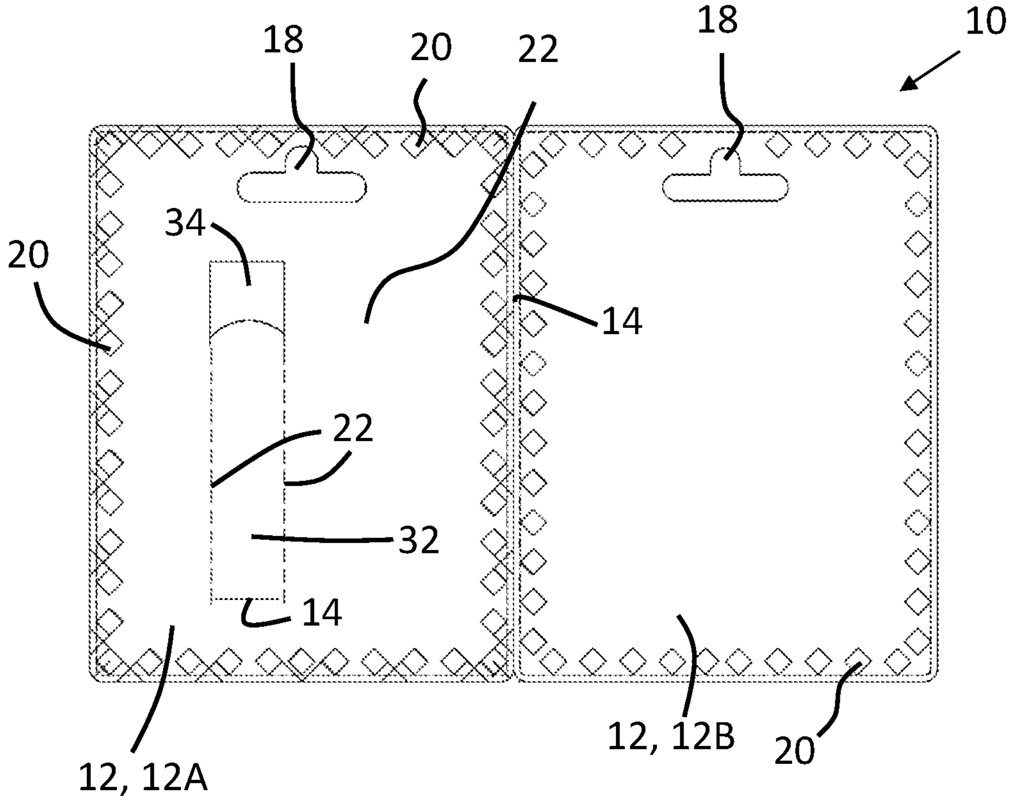
FIG. 9 is a front view of a partially assembled carrier having a diamond-shaped scoring pattern.

FIG. 9 illustrates a front view of a carrier 10. As shown, the carrier 10 includes a pair of panels 12. A first panel 12A and a second panel 12B are joined along a fold line 14. The first panel 12A and the second panel 12B are configured to fold on top of one another along the fold line 14 so that the panels 12 may be secured to each other by an adhesive a form a pocket therein (see FIG. 5). Each panel 12 includes an aperture 18 that align once the carrier 10 is assembled (see FIGS. 2A and 2B). The first panel 12A and the second panel 12B both include scoring 20 along each of its peripheral edges so that, once the first panel 12A and the second panel 12B are joined together, the scoring 20 may help indicate whether the carrier 10 has been tampered with. For example, it is envisioned that if a person were to tamper with the carrier 10 by separating the panels 12, the scoring 20 substantially break apart, thereby leaving visual evidence of the tampering. As shown in FIG. 9, the scoring 20 is a plurality of diamond-shaped patterns extending along the perimeter of the panels 12. The diamond-shaped patterns may be interconnected to form a cross-hatching similar to the scoring shown in FIG. 1. Alternatively, or additionally, the diamond-shaped scoring 20 may be individual and separate diamonds extending along a portion of the panels 12. For example, the first panel 12A may include a cross-hatching of interconnected diamonds while the second panel 12B may include a plurality of separate diamonds. Thus, the carrier 10 may beneficially tear or separate in a non-uniform manner along the perimeter as a result of the scoring design 20.

The first panel 12A may also include an access panel 32 formed in the first panel 12A by perforations 22. The access panel 32 may thus be separated from the first panel 12A along the perforations 22 and folded open along a fold line 14. The access panel 32 may also include a cutout 34 that allows visual confirmation of an item located within the carrier 10. For example, the cutout 34 may allow a retail store selling a prepaid card stored within the carrier 10 to confirm a serial number and/or barcode of the prepaid card without opening the carrier 10.

ELEMENT LIST

10 Carrier
12 Panel
12A First Panel
12B Second Panel
14 Fold Line
16 Adhesive
18 Aperture
20 Scoring
22 Perforation
24 Bay Door
26 Pocket
28 Tab
30 Prepaid Card
32 Access Panel
34 Cutout Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of 100+/−15.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:

1. A carrier comprising:

(a) a first panel;

(b) an opposing second panel secured to the first panel by an adhesive disposed between the first panel and the second panel near a periphery of the carrier to form a pocket between the first panel and the second panel; and (c) scoring along the first panel, the second panel, or both the first panel and the second panel that is aligned with the adhesive, wherein the scoring is located to overlie all portions of the carrier at which adhesive is disposed, wherein the scoring is configured to disassemble to visually indicate the carrier has been tampered with in response to separation of the first panel and the second panel.

2. The carrier of claim 1, wherein the scoring is located along one of the first panel and the second panel.

3. The carrier of claim 1, wherein the scoring is located on both the first panel and the second panel.

4. The carrier of claim 1, wherein the scoring is a pattern forming a plurality of substantially diamond shapes configured to disconnect from one another, the first panel, the second panel, or a combination thereof in response to separation of the first panel and the second panel.

5. The carrier of claim 1, wherein a bay door is formed along the first panel by perforations and the bay door opens along a fold line by separating the perforations.

6. The carrier of claim 5, further comprising a tab located along a peripheral edge of the bay door, the tab being configured to initiate separation of the perforations upon being pulled.

7. The carrier according to claim 6, wherein the tab extends to or beyond a peripheral edge of the first panel and is free of adhesive, scoring, or both.

8. The carrier of claim 5, wherein an access panel is formed to abut the bay door along the perforations and the access panel opens simultaneously with the bay door, independently of the bay door, or both.

9. The carrier according to claim 8, wherein the access panel includes a cutout aligned with an item located in the pocket of the carrier.

10. The carrier according to claim 1, wherein the first panel and the second panel are monolithically formed and hinged to each other by a fold line such that the first panel and the second panel are folded onto each other along the fold line to create the carrier.

11. The carrier according to claim 10, wherein the fold line between the first panel and the second panel is a partial cut through a thickness of the first panel and the second panel.

12. The carrier according to claim 1, wherein the carrier is a paperboard.

13. The carrier according to claim 1, wherein the scoring is configured to disassemble such that the carrier is unable to be reassembled after the carrier has been tampered with.

14. The carrier according to claim 1, wherein the scoring is located near a peripheral edge of the first panel, the second panel or both the first panel and the second panel, and wherein a central area of the first panel and the second panel that form the pocket is free of scoring.

15. The carrier according to claim 1, wherein the first panel and the second panel are coextensive.

16. The carrier according to claim 1, wherein the adhesive is free of extension beyond the periphery of the carrier and the pocket is free of the adhesive.

17. The carrier according to claim 1, wherein the pocket formed between the first panel and the second panel of the carrier is configured to hold a prepaid card.

18. A method of assembling the carrier according to claim 1, the method comprising:

(a) die cutting the first panel and the second panel;

(b) die cutting the scoring into the first panel, the second panel, or both the first panel and the second panel;

(c) applying an adhesive to the first panel, the second panel, or both the first panel and the second panel along the periphery;

(d) placing an item within an area that will form the pocket free of contact with the adhesive; and (e) folding the first panel and the second panel onto one another with the adhesive disposed between the first panel and the second panel to form the pocket by securing the first panel and the second panel together with the item therebetween.

19. The method according to claim 18, wherein steps (a) and (b) are done simultaneously.

* * * * *